United States Patent
Imamura et al.

(10) Patent No.: US 10,558,425 B2
(45) Date of Patent: Feb. 11, 2020

(54) DISPLAY CONTROL METHOD, DATA PROCESS APPARATUS, AND COMPUTER-READABLE RECORDING MEDIUM

(71) Applicant: FUJITSU LIMITED, Kawasaki-shi, Kanagawa (JP)

(72) Inventors: Kyosuke Imamura, Kokubunji (JP); Iori Murakami, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 186 days.

(21) Appl. No.: 15/130,241

(22) Filed: Apr. 15, 2016

(65) Prior Publication Data

US 2016/0342388 A1 Nov. 24, 2016

(30) Foreign Application Priority Data

May 22, 2015 (JP) .................................. 2015-104899

(51) Int. Cl.
*G06F 3/16* (2006.01)
*G06F 3/0484* (2013.01)
*G06F 3/01* (2006.01)

(52) U.S. Cl.
CPC .............. *G06F 3/167* (2013.01); *G06F 3/011* (2013.01); *G06F 3/04842* (2013.01)

(58) Field of Classification Search
CPC ............................ G06F 3/167; G06F 3/04842
See application file for complete search history.

(56) References Cited

U.S. PATENT DOCUMENTS

| | | | | |
|---|---|---|---|---|
| 6,489,976 B1 * | 12/2002 | Patil | .................... | G06F 3/04842 715/779 |
| 7,661,074 B2 * | 2/2010 | Sadler | ................. | G06F 3/04895 345/168 |
| 9,171,388 B2 * | 10/2015 | Morinaga | ........... | G06F 3/04815 |
| 9,453,740 B2 * | 9/2016 | Nguyen | ............. | G01C 21/3682 |
| 2002/0010589 A1 | 1/2002 | Nashida et al. | | |
| 2003/0158736 A1 * | 8/2003 | James | .................... | G06F 3/167 704/270.1 |
| 2012/0232977 A1 * | 9/2012 | Calman | .............. | G06Q 30/0251 705/14.25 |
| 2013/0201217 A1 | 8/2013 | Morinaga et al. | | |

(Continued)

FOREIGN PATENT DOCUMENTS

| JP | 11-134157 | 5/1999 |
|---|---|---|
| JP | 2000-112610 | 4/2000 |

(Continued)

OTHER PUBLICATIONS

Extended European Search Report dated Sep. 28, 2016 for corresponding European Patent Application No. 16165944.6, 6 pages.
(Continued)

*Primary Examiner* — William L Bashore
*Assistant Examiner* — Gregory A Distefano
(74) *Attorney, Agent, or Firm* — Fujitsu Patent Center

(57) ABSTRACT

A method that causes a computer to execute a display control process. The method includes generating identification information in a number corresponding to a number of object information included in a display area of a display, and displaying the object information and the identification information in association with each other.

17 Claims, 18 Drawing Sheets

(56) References Cited

U.S. PATENT DOCUMENTS

2013/0201293 A1   8/2013  Konno et al.
2014/0289323 A1   9/2014  Kutaragi et al.

FOREIGN PATENT DOCUMENTS

| JP | 2000-194532 A | 7/2000 |
|----|---------------|--------|
| JP | 2002-41276 A  | 2/2002 |
| JP | 2002-278587 A | 9/2002 |
| JP | 2012-095261   | 5/2012 |
| JP | 2012-103789   | 5/2012 |
| JP | 2013-088906   | 5/2013 |

OTHER PUBLICATIONS

Japanese Office Action dated Nov. 6, 2018 for corresponding Japanese Patent Application No. 2015-104899, with English Translation, 6 pages.
Japanese Office Action dated Jun. 4, 2019 for corresponding Japanese Patent Application No. 2015-104899, with English Translation, 6 pages.
European Office Action dated Sep. 2, 2019 for corresponding European Patent Application No. 16165944.6, 7 pages.

* cited by examiner

FIG.2
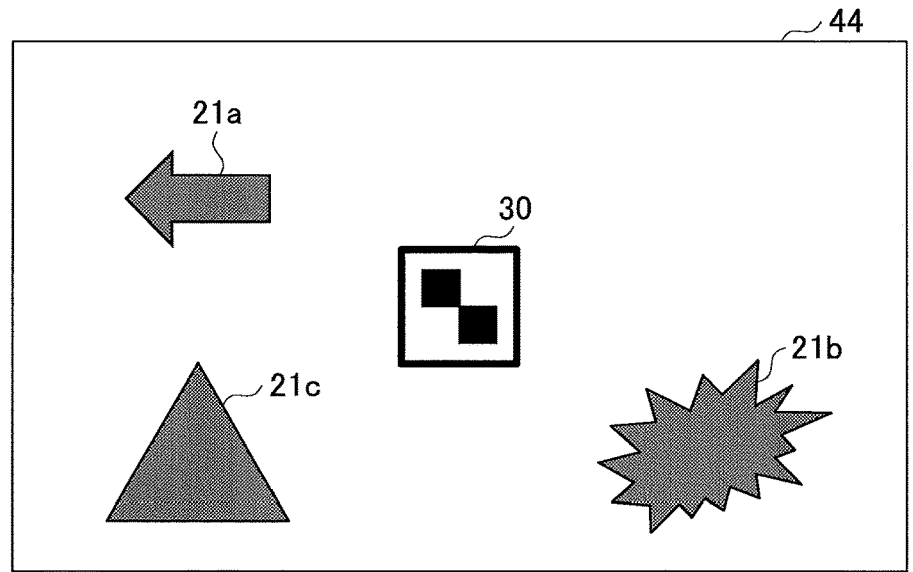
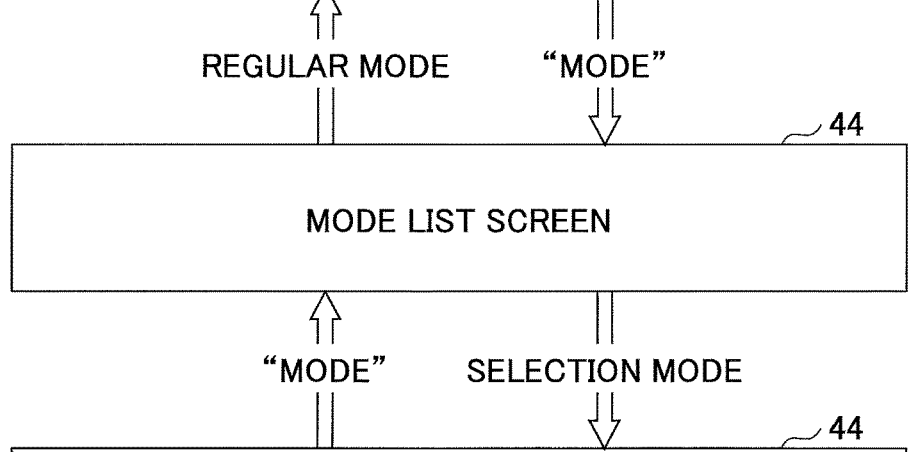
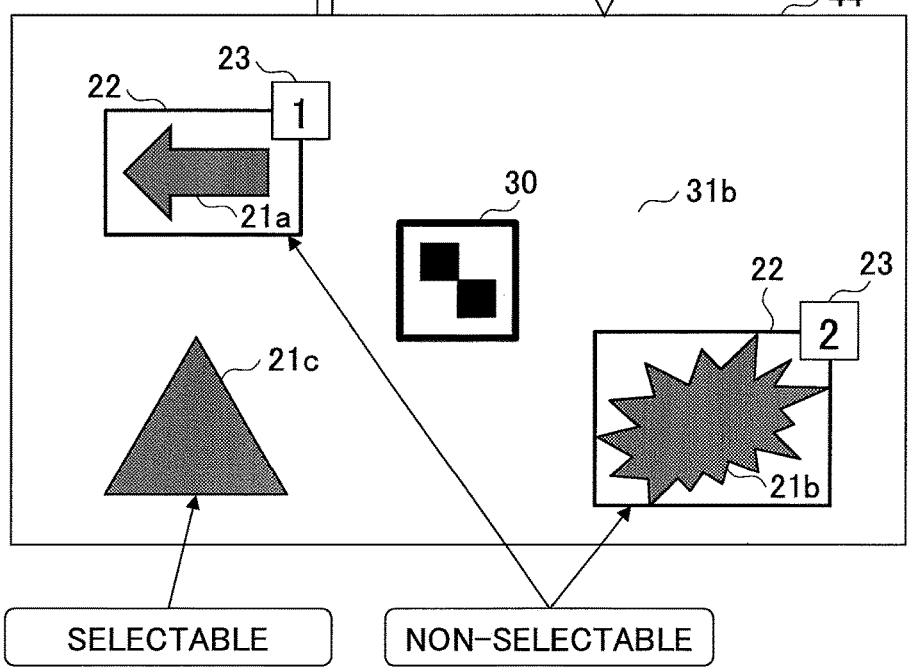

FIG.6A

| NUMBER | OBJECT DATA |
|---|---|
| 1 | A |
| 2 | B |
|  |  |
|  |  |
|  |  |
|  |  |
|  |  |
|  |  |
|  |  |
|  |  |

FIG.6B

| NUMBER | OBJECT DATA |
|---|---|
| 1 | A |
| 2 | B |
| 3 | C |
| 4 | D |
| 5 | E |
| 6 | F |
| 7 | G |
| 8 | H |
| 9 | I |
| 10 | J |

FIG.6C

| NUMBER | OBJECT DATA |
|---|---|
| 2 | B |
| 3 | C |
| 4 | D |
| 5 | E |
| 6 | F |
| 7 | G |
| 8 | H |
| 9 | I |
| 10 | J |
| 1 | K |

FIG.7A

| AUDIO COMMAND | OPERATION OBJECT | POINTER |
|---|---|---|
| ONE | OBJECT DATA ASSIGNED WITH 1 | ◯ (PREVIOUS POINTER) |
| TWO | OBJECT DATA ASSIGNED WITH 2 | ◯ (PRESENT POINTER) |
| THREE | OBJECT DATA ASSIGNED WITH 3 | ◯ (SUBSEQUENT POINTER) |
| FOUR | OBJECT DATA ASSIGNED WITH 4 | |
| FIVE | OBJECT DATA ASSIGNED WITH 5 | |
| SIX | OBJECT DATA ASSIGNED WITH 6 | |
| SEVEN | OBJECT DATA ASSIGNED WITH 7 | |
| EIGHT | OBJECT DATA ASSIGNED WITH 8 | |
| NINE | OBJECT DATA ASSIGNED WITH 9 | |
| TEN | OBJECT DATA ASSIGNED WITH 10 | |

FIG.7B

| AUDIO COMMAND | OPERATION OBJECT | POINTER |
|---|---|---|
| THEN, NEXT, RIGHT, DOWN | SUBSEQUENT POINTER | – |
| BEFORE, LEFT, UP | PREVIOUS POINTER | – |
| MODE | MODE LIST SCREEN | – |
|  |  |  |

FIG.13
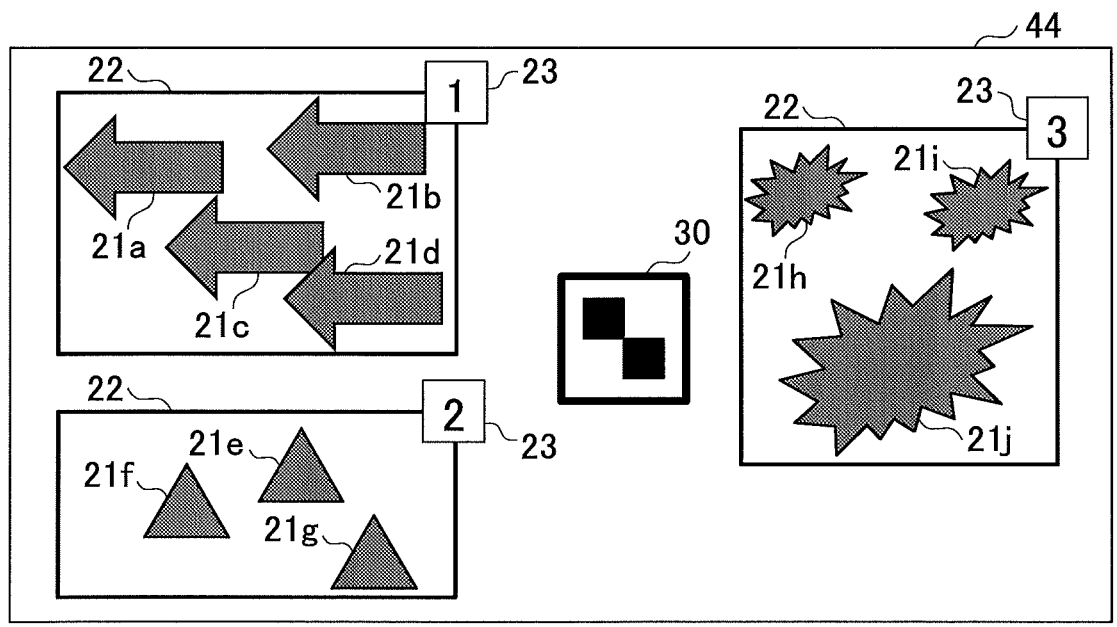
SELECT [2]
BY AUDIO
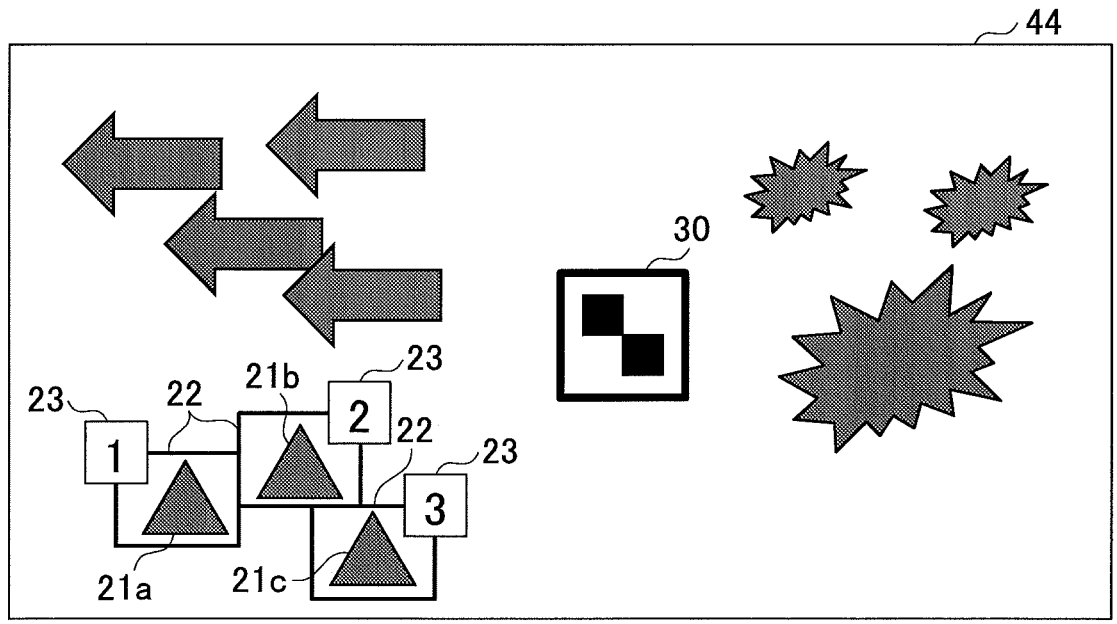

FIG.15A

| NUMBER | OBJECT DATA |
|---|---|
| G1 | A |
| G1 | B |
| G1 | C |
| G1 | D |
| G2 | E |
| G2 | F |
| G2 | G |
| G3 | H |
| G3 | I |
| G3 | J |

FIG.15B

| NUMBER | OBJECT DATA |
|---|---|
| 1 | E |
| 2 | F |
| 3 | G |
|  |  |
|  |  |
|  |  |
|  |  |
|  |  |
|  |  |
|  |  |

FIG.16
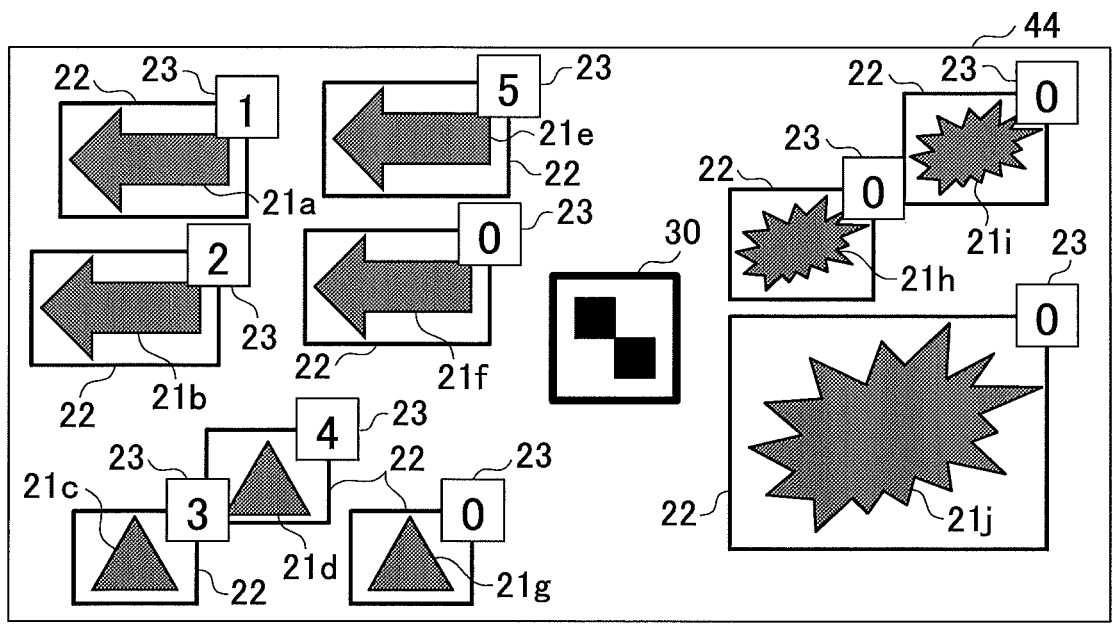
SELECT [0] BY AUDIO
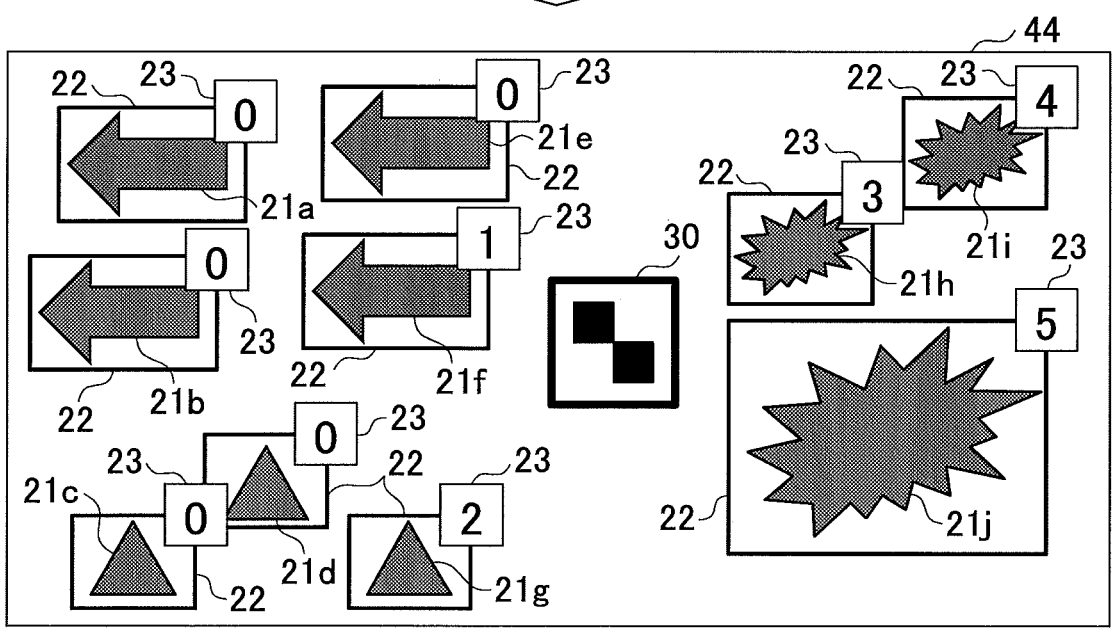

DISPLAY CONTROL METHOD, DATA PROCESS APPARATUS, AND COMPUTER-READABLE RECORDING MEDIUM

CROSS-REFERENCE TO RELATED APPLICATIONS

This application is based upon and claims the benefit of priority of the prior Japanese Patent Application No. 2015-104899 filed on May 22, 2015, the entire contents of which are incorporated herein by reference.

FIELD

The embodiments discussed herein are related to a display control method, a data process apparatus, and a computer-readable recording medium.

BACKGROUND

In recent years, various display apparatuses and technology for displaying images of different sizes and shapes have been developed. For example, there is known AR (Augmented Reality) technology in which an image captured by a camera mounted on an HMD (Head Mount Display), a smartphone, or a tablet-type terminal is used (see, for example, Japanese Laid-Open Patent Publication No. 2012-103789). For example, AR technology may be used to overlay object data identified by a mark captured by a camera with scenery or the like of a reality space and display the overlaid data.

The HMD has a structure in which a screen is positioned in front of the eyes of the user. This structure of the HMD causes difficulty in enabling the user to perform input control by directly touching the screen. In contrast, a terminal such as a smartphone allows the user to easily perform input control by directly touching the screen of the terminal. However, in a case of working with both hands while viewing the screen of the terminal, an input operation besides the touch operation is preferable from the standpoint of improving work efficiency. The use of gestures or a controller are considered as examples of input operations besides the touch operation. However, because these examples still require the use of the user's hands for performing gestures or operating the controller, it is difficult for the user to perform an input operation while working with both hands. In contrast, an input operation using audio recognition enables the user to perform an input operation while working with both hands.

SUMMARY

According to an aspect of the invention, there is provided a method that causes a computer to execute a display control process. The method includes generating identification information in a number corresponding to a number of object information included in a display area of a display, and displaying the object information and the identification information in association with each other.

The object and advantages of the invention will be realized and attained by means of the elements and combinations particularly pointed out in the claims.

It is to be understood that both the foregoing general description and the followed detailed description are exemplary and explanatory and are not restrictive of the invention, as claimed.

BRIEF DESCRIPTION OF DRAWINGS

FIG. 2 is a schematic diagram for describing the numbering of object data according to an embodiment of the present invention;

FIGS. 6A to 6C are schematic diagrams illustrating numbering list tables according to the first embodiment of the present invention;

FIGS. 7A and 7B are schematic diagrams illustrating dictionary tables according to an embodiment of the present invention;

FIG. 13 is a schematic diagram for describing the numbering of object data according to the third embodiment of the present invention;

FIGS. 15A and 15B are numbering list tables according to the third embodiment of the present invention;

FIG. 16 is a schematic diagram for describing the numbering of object data according to a modified example of the third embodiment of the present invention.

DESCRIPTION OF EMBODIMENTS

In a case of performing audio input, desired object data (hereinafter also referred to as "object information") is selected by speaking identification data (hereinafter also referred to as "identification information") (e.g., characters, symbols) associated with object data displayed on a screen. However, in some cases, selecting object data by way of audio may be difficult depending on the identification data associated with the object data. For example, the selection of object data by way of audio may be difficult in a case where the number of characters and symbols included in the identification data is large, a case where the regularity of the allocation of the characters and symbols included in the identification data is insufficient, or a case where the allocation of characters and symbols included in the identification data is complicated.

Next, embodiments of the present invention are described with reference to the accompanying drawings. In the description and the drawings depicting the embodiment of the present invention 1 is a schematic drawing illustrating a program configuration according to an embodiment of the present invention.

Example of Functional Configuration of HMD

Figure 1:
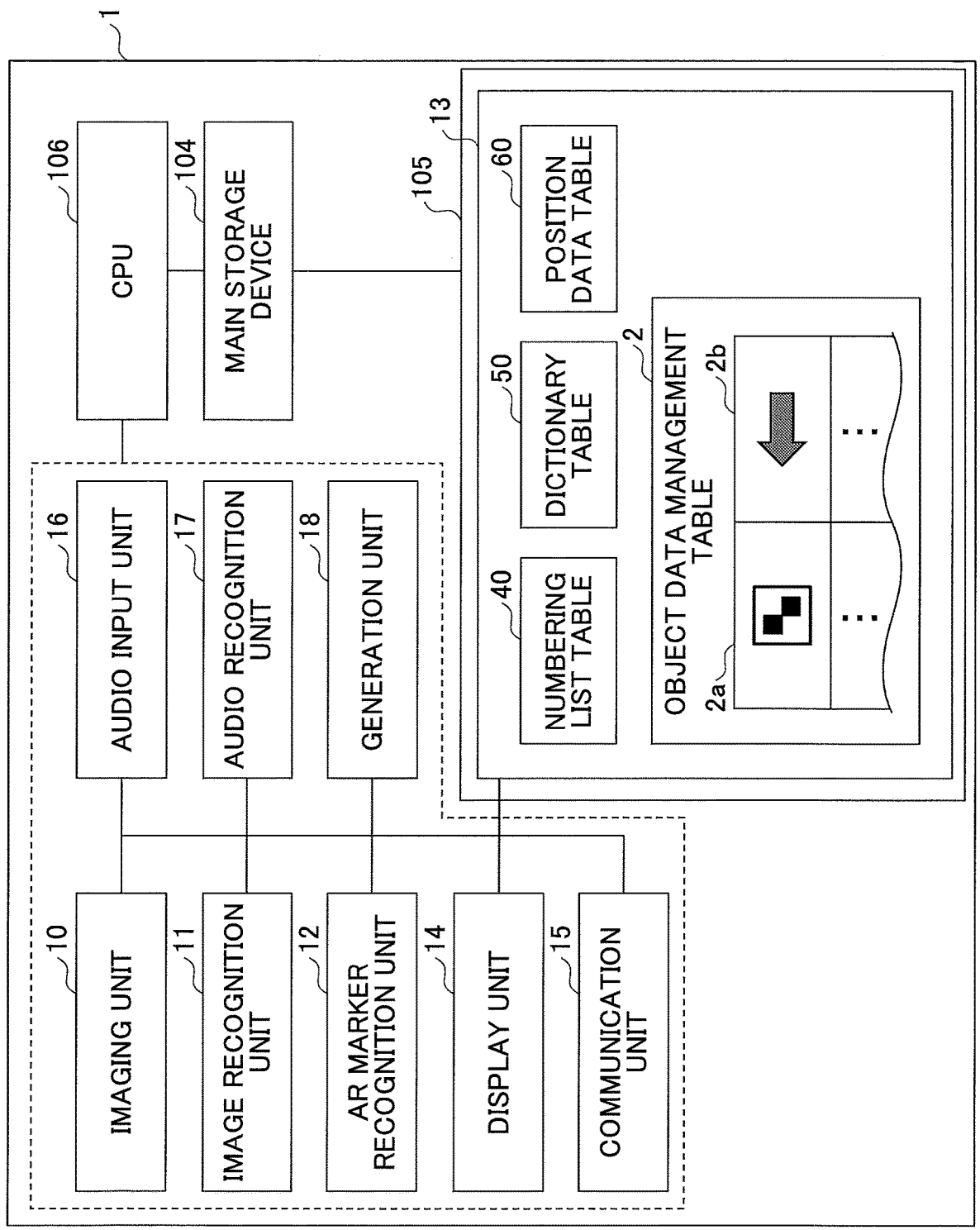
FIG. 1 is a schematic diagram illustrating a functional configuration of an HMD according to an embodiment of the present invention.

An example of a functional configuration of an HMD 1 is described with reference to FIG. 1. The HMD 1 is an example of a data process apparatus. The data process apparatus includes an image capture unit and a display unit. As long as the image process apparatus is a device capable of processing data, the image processing apparatus may be, for example, a tablet type terminal, a smartphone, a PDA (Personal Digital Assistant), a notebook type PC (Personal Computer), a game device, or a mobile phone. The data process apparatus does not necessarily require a communication unit.

The HMD 1 includes an image capture unit 10, an image recognition unit 11, an AR marker recognition unit 12, a storage unit 13, a display unit 14, a communication unit 15, an audio input unit 16, an audio recognition unit 17, and a generation unit 18. The image capture unit 10 photographs a real space inside a predetermined angular field of view. The image that is captured (target capture image) may be a moving image (video) or a still image. In a case where the target capture image is a moving image, the target capture image includes multiple image frames. The image capture unit 10 may be, for example, a camera. However, the image capture unit 10 is not limited to a camera. The HMD 1 photographs an image an AR marker in a real space by using the image capture unit 10 such as a camera.

The image recognition unit 11 detects an AR marker included in an image photographed by the image capture unit 10. The image recognition unit 11 obtains, for example, position data of a detected AR marker. When the image recognition unit 11 detects an AR marker, the AR marker recognition unit 12 refers to an object data management table 2 registered beforehand in the storage unit 13 and obtains object data registered in association with the AR marker based on the object data management table 2. The object data management table 2 may be managed inside the HMD 1. Alternatively, the object data management table 2 may be managed by another device that can communicate with the HMD 1 via a network. In this embodiment, the storage unit 13 manages the object data management table 2 to which an AR marker 2a and object data 2b associated with the AR marker 2a are registered as illustrated in FIG. 1.

The AR marker is a marker (sign) for designating, for example, various contents of object data or the position for displaying the object data. In this embodiment, the AR marker is an image having a predetermined design or character pattern formed in a predetermined area such as a two-dimensional code. However, the AR marker is not limited to such image. Further, the object data is, for example, model data of a three-dimensional object placed in a three-dimensional virtual space corresponding to a real space. The object data is data that overlaid on a predetermined object in a real space and displayed on a screen.

In this embodiment, the object data associated with an AR marker or the like includes various forms of data (e.g., text, an icon, animation, a mark, a design, an image, a video (e.g., moving image). The AR object is not limited to an object that is output by being displayed on a screen or the like. For example, the AR object may be, for example, audio data (hereinafter also referred to as "audio information").

The image recognition unit 11 detects the AR marker 30 included in a target capture image as illustrated in FIG. 2. The AR marker recognition unit 12 extracts object data associated with the AR marker 30 from the object data management table 2. The display unit 14 displays the extracted object data 21a, 21b, and 21c (hereinafter also collectively referred to as "object data 21") on a predetermined position of a screen 44.

The storage unit 13 stores a program(s) and various data required for executing a display control process according to an embodiment of the present invention. Other than the object data management table 2, the storage unit 13 also includes, for example, a numbering list table 40, a dictionary table 50, and a position data table 60 as described below.

The audio input unit 16 inputs audio of a user. The audio recognition unit 17 recognizes an audio command from the input audio and extracts an operation target corresponding to audio command based on the dictionary table 50.

The display unit 14 overlays the object data 21a, 21b, 21c on corresponding objects of a real space and displays the overlaid object data 21a, 21b, 21c on the screen 44. In this embodiment, the display unit 14 is an eyeglass-shaped display for the HDM 1.

The generation unit 18 assigns a number corresponding to each object data 21 displayed on the screen 44. The number assigned to the object data 21 is an example of identification data of object data. Although a numeral (number) is assigned to the object data in this embodiment, the identification data of object data may also be a letter (character), a symbol, or a combination of any of such numeral, letter, and symbol.

Example of Hardware Configuration of HMD

Figure 3:
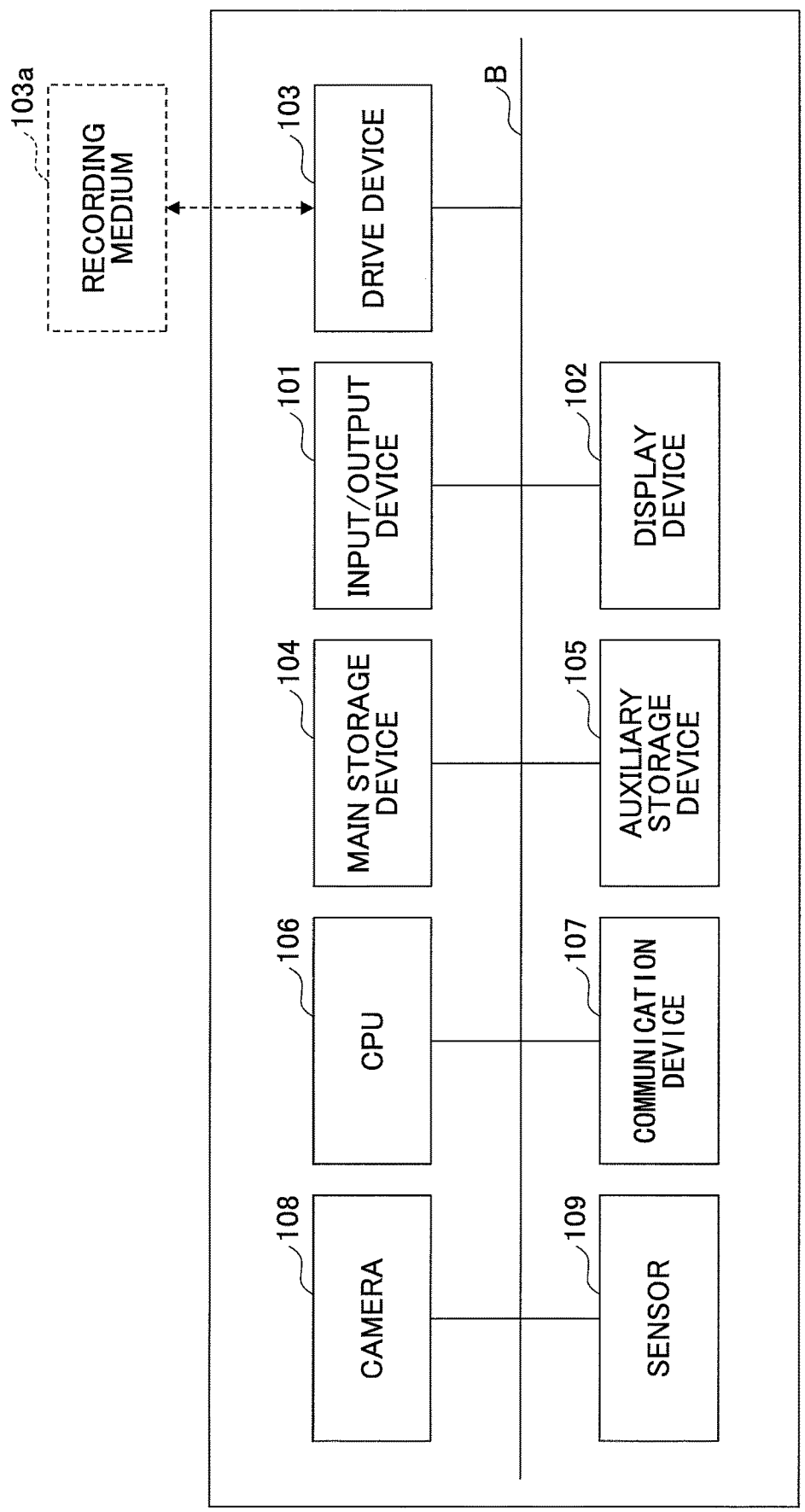
FIG. 3 is a schematic diagram illustrating a hardware configuration of an HMD according to an embodiment of the present invention.

Next, an example of a hardware configuration of the HMD 1 is described with reference to FIG. 3. The HMD 1 includes an input/output device 101, a display device 102, a drive device 103, a main storage device 104, an auxiliary storage device 105, a CPU (Central Processing Unit) 106, a communication device 107, a camera 108, and a sensor 109 that are connected to each other by a bus B.

The input/output device 101 is used for inputting an operation signal(s) and outputting audio. The input/output device 101 includes a microphone (hereinafter also referred to as "mike") for inputting audio. Specifically, the microphone is for inputting audio let out from a user and other sounds. The input/output device 101 also includes a speaker for outputting audio. Specifically, the speaker is for outputting audio of a counterpart (e.g., telephone counterpart) and other sounds such as a ringtone. Although the microphone is used for conversing with a telephone counterpart byway of a telephone function, the microphone is not limited to such purpose. For example, the microphone may be used for performing an input operation by way of audio. The microphone of the input/output device 10 can implement the function of the audio input unit 16 of FIG. 1.

The display device 102 displays a screen (e.g., an image having an AR object overlaid on a real space) to the user. The screen may be set by an OS (Operating System) or other various applications. The display device 102 is a display such as an LCD (Liquid Crystal Display) or an organic EL (Electro Luminescence) display. The display device 102 implements the function of the display unit 14 of FIG. 1.

A recording medium 103a or the like can be detachably mounted to the drive device 103. The drive device 103 can read various data recorded in the recording medium 103a and write predetermined data to the recording medium 103a. The drive device 103 of this embodiment is a medium-mounting slot. However, other drives besides the medium-mounting slot may be used as the drive device 103. The recording medium 103a is a recording medium from which data can be read from a computer that stores, for example, the above-described program for executing the display control process. The recording medium 103a may be a semiconductor memory such as a flash memory. Further, the recording medium 103a may also be a portable-type recording medium such as a USB (Universal Serial Bus) memory. However, other recording media besides those described above may also be used as the recording medium 103a.

The main storage device 104 stores a program (execution program) read from the auxiliary storage device 105 according to an instruction from the CPU 106. Further, the main storage device 104 also stores various data obtained during the execution of the execution program. The main storage device 104 is, for example, a ROM (Read Only Memory) or a RAM (Random Access Memory).

The auxiliary storage device 105 is a storage such as a HDD (Hard Disk Drive) or an SSD (Solid State Drive). The auxiliary storage device 105 may store the execution program (e.g., display control program) or a control program provided in a computer based on a control signal from the CPU 106, and input and output the programs according to necessity. Further, the auxiliary storage device 105 may read necessary data from various stored data and write data based on a control signal from the CPU 106. The main storage device 104 and the auxiliary storage device 105 are examples of the storage unit 13.

The CPU 106 controls the processes of the entire computer such as performing various calculations and inputting/outputting data to/from each of the hardware units described above.

Specifically, the CPU 106 executes a program installed in the auxiliary storage device 105 based on, for example, the activation of an application. Thereby, the CPU 106 executes a process corresponding to a program loaded to the main storage device 104. For example, the CPU 106 executes an image capture process of the image capture unit 10, an image recognition process of the image recognition unit 11, an AR marker recognition process of the AR marker recognition unit 12, an audio recognition process of the audio recognition unit 17, and an object data numbering process of the generation unit 18. Further, the CPU 106 controls the displaying of overlaid object data of the display unit 14 by executing the display control program. However, the CPU 106 is not limited to executing the above-described processes but may also execute other processes. Further, results of the processes that are executed by the CPU 106 are stored in, for example, the auxiliary storage device 105 according to necessity.

The communication device 107 is a communication interface that allows data to be transmitted to and receive from another computer. The communication device 107 is an example of the communication unit 15. The camera 108 captures an image (moving image, still image) of a real space inside a predetermined angular field of view. The camera 108 is an example of the image capture unit 10.

The sensor 109 obtains the current position of the HMD 1 by using, for example, a GPS (Global Positioning System). In the embodiment using the GPS, the display unit 14 may display object data that is overlaid in accordance with current position data obtained from the GPS instead of displaying object data that is overlaid in accordance with an AR marker.

In this embodiment, processes such as a display control process can be implemented by installing an execution program such as a display control program in the above-described hardware configuration of the HMD 1, so that the hardware configuration of the HMD 1 can cooperatively operate with software stored in, for example, the storage unit 13.

First Embodiment

Example of Display Control Process

Figure 4:
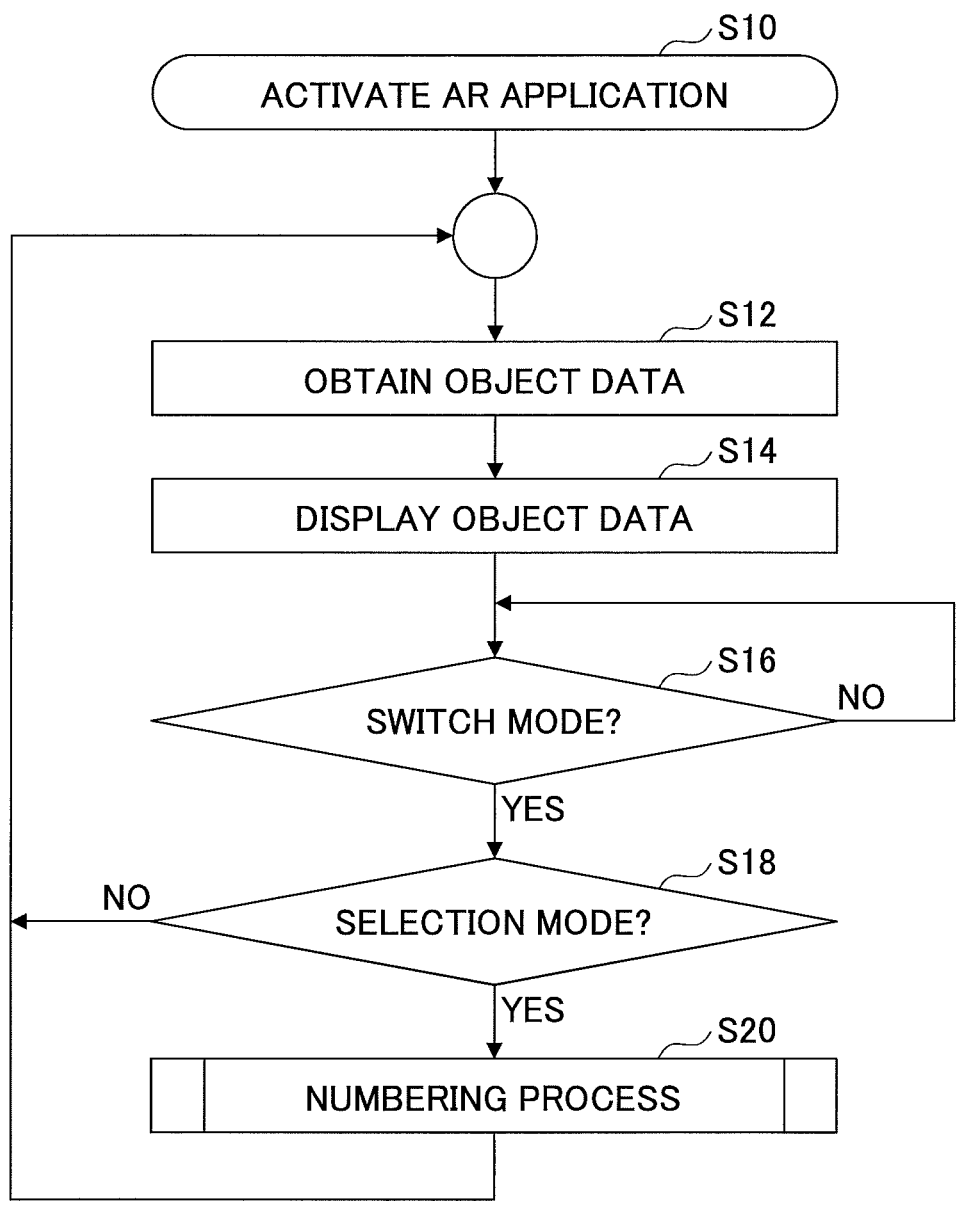
FIG. 4 is a flowchart illustrating a display control process of a screen according to a first embodiment of the present invention.
Figure 5:
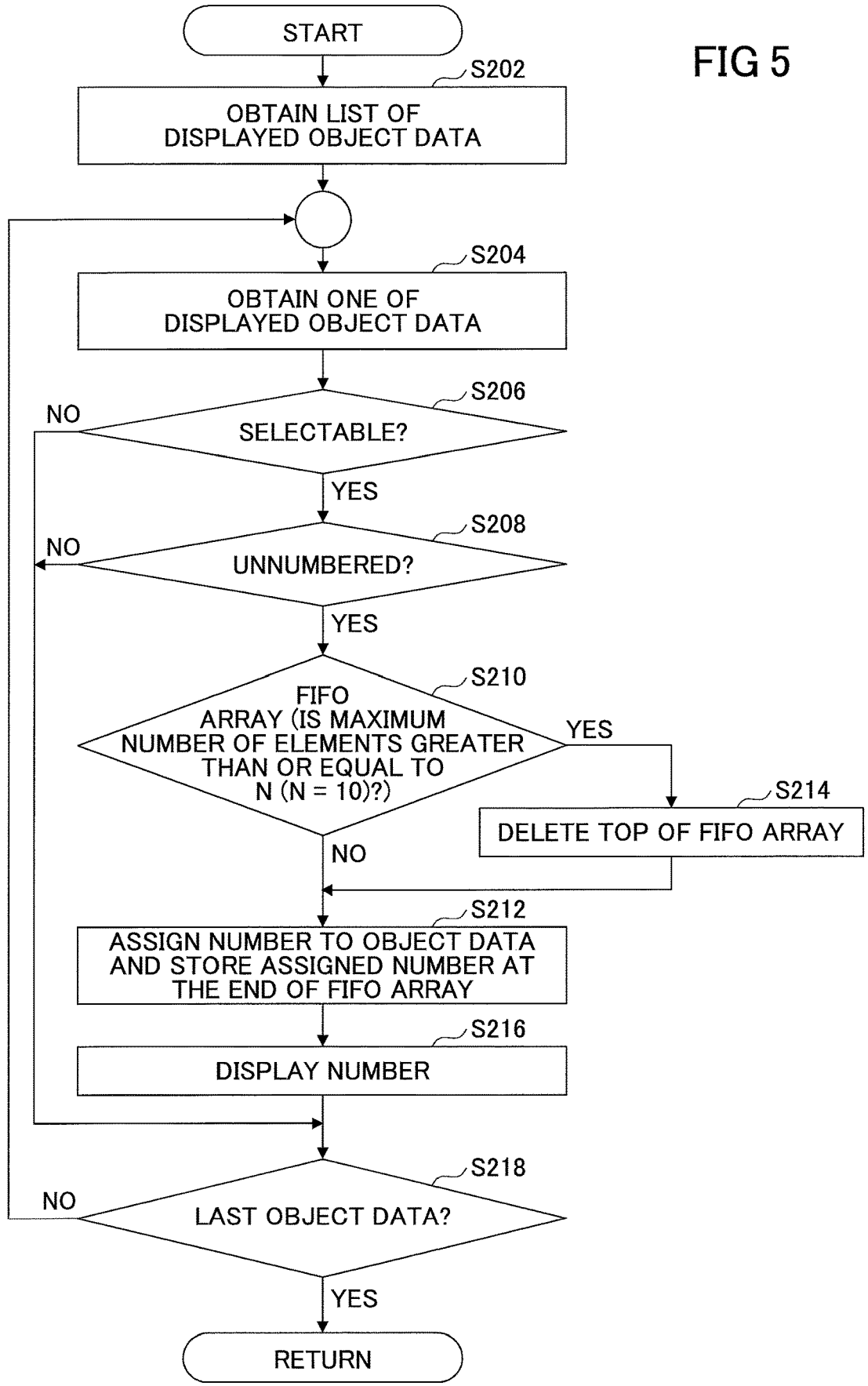
FIG. 5 is a flowchart illustrating a numbering process of a screen according to the first embodiment of the present invention.

Next, an example of a display control process and an example of a numbering process according to the first embodiment are described with reference to FIGS. 4 and 5. FIG. 4 is a flowchart illustrating the display control process of the first embodiment. FIG. 5 is a flowchart illustrating the numbering process of the first embodiment.

As illustrated in FIG. 4, when an AR application for performing overlay display on object data is activated (S10), the AR application obtains object data based on the AR marker 30 included in the image captured by the image capture unit 10 (Step S12).

Specifically, the image recognition unit 11 detects an AR marker included in an image captured by the image capture unit 10. Further, the image recognition unit 11 obtains, for example, position data of the detected AR marker. The AR marker recognition unit 12 extracts object data 21 corresponding to the AR marker 30 from the object data management table 2.

The display unit 14 reads an overlay position from the AR marker 30 and displays the object data 21 at the overlay position (Step S14). Thus, by using AR technology, the object data 21a, 21b can be overlaid and displayed in a real space as illustrated in the example of FIG. 2.

Returning to FIG. 4, the audio recognition unit 17 determines whether mode conversion has been instructed (Step S16). For example, in a case where the audio recognition unit 17 recognizes that the audio input from the audio input unit 16 is "mode" when the user inputs audio to the audio input unit 16, the display unit 14 displays a "mode list screen" of an operation target 52 corresponding to the "mode" of an audio command 51 in the dictionary table 50 (see FIGS. 7A and 7B). Accordingly, the screen 44 changes from a "non-selection mode" screen to a "mode list" screen (e.g., wizard). In a case where the user selects a "selection mode" displayed on the "mode list screen" by way of audio, the audio input unit 16 inputs the user's audio to the audio recognition unit 17, and then, the audio recognition unit 17 determines that "selection mode" is selected based on the audio input from the audio input unit 16 (Step S18). In a case where the audio recognition unit 17 determines that "selection mode" is selected, the generation unit 18 executes a numbering process (Step S20). After the numbering process is executed, the operation of FIG. 4 returns to Step S12. In a case where the audio recognition unit 17 determines that "selection mode" is not selected based on the audio input from the audio input unit 16, the operation of FIG. 4 returns to Step S12.

The user may use other contrivances or methods to select the "selection mode" based on the mode list screen 44. For example, the user may select the "selection mode" by using a keyboard, a mouse, or by way of a touch operation (e.g., finger). However, in a case where the user is working with both hands, mode selection by way of audio is preferable.

In this embodiment, the processes in Steps S12 to S20 are repeated during a process of obtaining an image(s) with the image capture unit 10.

In this embodiment, when the user utters "mode", the screen 44 changes from the "non-selection mode" screen (screen on the upper side of FIG. 2) to the "mode list" screen in response to the utterance of the user. When the user utters "selection mode" in a state where the "mode list" screen is displayed, the screen 44 changes from the "mode list" screen to the "selection mode" screen (screen on the lower side of FIG. 2) in response to the utterance of the user.

Alternatively, in a case where a mode other than the "selection mode" is not required, the "mode list" screen may be omitted. In this case, when the user utters "mode", the screen changes from the "non-selection mode" screen (screen on the upper side of FIG. 2) to the "selection mode" screen (screen on the lower side of FIG. 2) in response to the utterance of the user. To prevent an error due to erroneous recognition of audio, this embodiment provides the "non-selection mode" and the "selection mode" separately, so that a screen for each mode is displayed. However, the modes do not necessarily need to be divided and displayed separately.

The following describes an embodiment under a situation where the "selection mode" screen is displayed, the object data 21a, 21b are selectable, and the object data 21c is non-selectable. The display unit 14 displays the selectable object data 21a, 21b with emphasis by encircling the object data 21a, 21b with frames 22, so that the selectable object data 21a, 21b can be distinguished. However, the display unit 14 may display the object data 21a, 21b without emphasizing the object data 21a, 21b with the frames 22. In this situation, the numbers "1" and "2" that are to be assigned to the object data 21a, 21b are not yet displayed on the screen 44.

Example of Numbering Process

FIG. 5 is a flowchart illustrating an example of the numbering process of Step S20 of FIG. 4. First, the generation unit 18 obtains a list of the object data that are displayed on the screen 44 (Step S202). In this embodiment, the object data 21a, 21b, and 21c illustrated in the lower screen of FIG. 2 are obtained.

Then, the generation unit 18 obtains one of the displayed object data 21 (Step S204). In this step, the object data 21c illustrated in the lower screen of FIG. 2 is assumed to be the object data 21 obtained by the generation unit 18.

Then, the generation unit 18 determines whether the obtained object data 21c is selectable (Step S206). Because the object data 21c cannot be selected (No in Step S206), the numbering process of FIG. 5 proceeds to Step S218. Then, the generation unit 18 determines whether the object data 21c is the last object data (Step S218). In a case where the generation unit 18 determines that the object data 21c is not the last object data (No in Step S218), the numbering process of FIG. 5 returns to Step S204.

Then, the generation unit 18 obtains one of the displayed object data 21 (Step S204). In this step, the object data 21a illustrated in the lower screen of FIG. 2 is assumed to be the object data 21 obtained by the generation unit 18. Then, the generation unit 18 determines whether the obtained object data 21a is selectable (Step S206). Because the object data 21a can be selected (Yes in Step S206), the generation unit 18 then determines whether the object data 21a is numbered (assigned with a number) (Step S208). In this step, the object data 21a is not yet numbered.

Therefore, the generation unit 18 determines whether the maximum element number of the FIFO (First In First Out) array of the numbering list table 40 is greater than or equal to N ("N" being a given integer, in this example, N=10) (Step S210). Although the maximum number of elements that can be numbered "N" is set to be "10" in this embodiment, the maximum number of elements that can be numbered may be any given integer.

At this stage, no data is stored in the numbering list table 40 yet. Therefore, N=0. Accordingly, the generation unit 18 numbers (assigns) the object data 21a with a number "1" (Step S212). The storage unit 13 associates the assigned number with the object data 21a and stores the associated number and the object data 21 at the end of the FIFO array of the numbering list table 40 (Step S212). Examples of the numbering list table 40 are illustrated in FIGS. 6A to 6C. In the numbering list table 40, object data 42 is stored together with a corresponding number 41. In the following, the object data 21a is stored as object data "A", the object data 21b is stored as object data "B", and . . . so forth. The numbering list table 40 is an example of relationship data (hereinafter also referred to as "relationship information") that includes the object data 42 associated with the corresponding number 41 serving as the identification data corresponding to the object data 42.

In this embodiment, the numbering list table 40 is a FIFO array. As illustrated in FIG. 6A, a number assigned to each object data is sequentially stored starting from the first number.

Therefore, at this stage, the object data 42 "A" and the corresponding assigned number 41 "1" are stored at the top of the numbering list table 40 as illustrated in FIG. 6A.

Then, returning to the flowchart of FIG. 5, the display unit 14 displays the assigned number "1" in the vicinity of the object data 21a identified by the object data 42 "A" (Step S216). As a result, the assigned number "1" 23 is displayed in the vicinity of the object data 21a as illustrated in (b) of FIG. 2.

Then, returning to the flowchart of FIG. 5, the generation unit 18 determines whether the numbered object data 21a is the last object data 21 (Step S218). In a case where the numbered object data 21a is the last object data 21, the numbering process of FIG. 5 is finished. At this stage, the object data 21b is not yet numbered. Therefore, the generation unit 18 determines that the numbered object data 21a is not the last object data 21. Accordingly, the numbering process of FIG. 5 returns to Step S204.

Then, the processes of Step S204 to Step S212 are repeated in a similar manner described above. Thereby, the object data 42 "B" and the corresponding assigned number 41 "2" are stored at the second row of the numbering list table 40 as illustrated in FIG. 6B. Further, the assigned number "2" is displayed in the vicinity of the object data 21b identified by the object data 42 "B" as illustrated in (b) of FIG. 2.

Then, returning to the flowchart of FIG. 5, the generation unit 18 determines whether the numbered object data 21b is the last object data 21 (Step S218). At this stage, the generation unit 18 determines that the object data 21b is the last object data 21. Accordingly, the numbering process of FIG. 5 is finished.

Because the object data 21 displayed on the screen 44 is three in this embodiment, the numbering process is finished without proceeding to Step S214. However, in a case where ten object data 21 have been numbered, the maximum element number N registered (stored) in the numbering list table 40 is "10". Thus, when the processes of Steps S204 to S210 are performed on a subsequent object data 21, the numbering process of FIG. 5 proceeds to Step S214. Accordingly, the object data 42 "A" and the corresponding number 41 "1" that are stored at the beginning of the numbering list table 40 (see FIG. 6B) are erased from the numbering list table 40. Then, in Step S212, the generation unit 18 assigns a number to the new (subsequent) object data 21, and the storage unit 13 stores the new object data 42 and the assigned number 41 at the end of the numbering list table 40. Accordingly, the new object data indicated as the object data 42 "K" and the assigned number 41 "1" are stored in the numbering list table "K" as illustrated in FIG. 6C. Further, the assigned number "1" is displayed in the vicinity of the new object data on the screen 44.

In this embodiment, a different number (integer) starting from 1 to 9 is assigned to each object data. However, a different character string or a different symbol may be assigned to each object data instead assigning a number to each object data. Alternatively, each object data may be assigned with a numeral, a character, a symbol, or a combination thereof.

With the above-described embodiment, each object data can be displayed on a screen with a unique number by using a relatively small amount of numbers. Accordingly, the visibility of the screen displaying the object data can be prevented from degrading. For example, the number "1" is assigned to the selectable object data 21a, and the number "2" is assigned to the selectable object data 21b according to FIG. 6B and the lower screen in FIG. 2. Therefore, this embodiment enables either one of the object data 21a, 21b to be accurately selected by way of audio. For example, when the user utters "one" in a case where the lower screen in FIG. 2 is displayed, the audio recognition unit 17 recognizes the user's utterance as "one". The generation unit 18 searches the dictionary table 50, identifies the operation target 52 corresponding to the audio command 51 "one" and being the object data assigned with "1", and selects the object data 21a displayed on the lower screen in FIG. 2.

With the display control process and the numbering process according to the first embodiment, the visibility of a screen displaying object data can be prevented from degrading by assigning a number to each selectable object data 21 and displaying the numbered object data. Further, the user can accurately select a desired object data by inputting (uttering) the number assigned to the desired object data by way of audio.

Particularly, in a case of using the HMD 1 or the like in which the object data 21 is displayed in a small screen near the eyes of the user, a touch operation it is difficult to designate object data 21 densely allocated in the screen by way of touch operation or gestures. Thus, it may be difficult to determine the object data designated by the user. As a result, the accuracy in designating object data may be poor. However, with the display control process and the numbering process according to the first embodiment, the visibility of a screen displaying the object data 21 can be prevented from degrading by assigning a number to each selectable object data 21 and displaying the numbered object data. Further, the object data 21 designated by the user can be selected without error by allowing the user to input the number by way of audio or the like.

In this embodiment, the size of the dictionary table 50 is limited because the HMD 1 may be used in an environment that is not connected to a server. In this embodiment, the maximum number of commands that can be registered in the dictionary tables 50 of FIGS. 7A and 7B is approximately 40 kinds. In such environment, approximately 10 different numbers are assigned to selectable object data by using the numbering process described above. Accordingly, even if the HMD 1 used under the conditions where the number of audio commands that can be registered in the dictionary table 21 is limited, the visibility of the screen displaying object data can be prevented from degrading. Further, the selecting of displayed object data 21 can be facilitated by assigning numbers to the object data 21.

Alternatively, an LRU (Least Recently Used) algorithm may be used for the number list table 40 of this embodiment as well as the number list tables 40 of the below-described modified examples and embodiments instead of the above-described FIFO algorithm.

Second Embodiment

Example of Display Control Process

Figure 8:
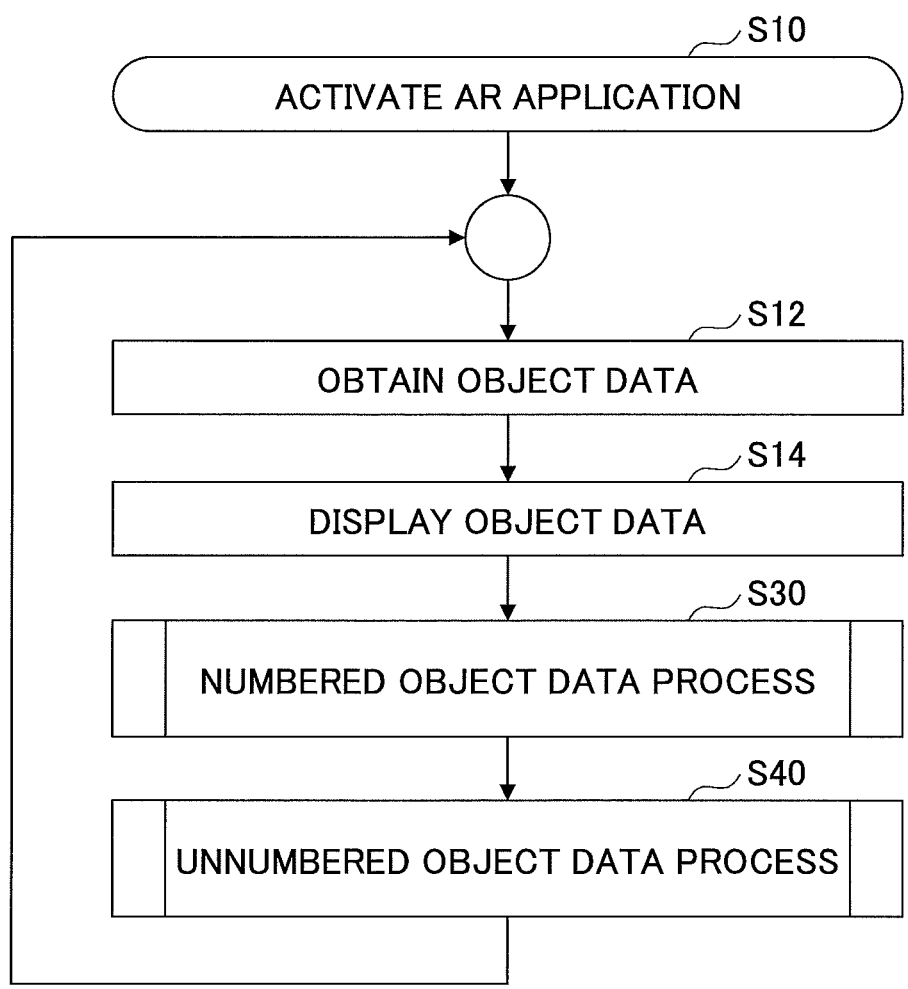
FIG. 8 is a flowchart illustrating a display control process according to a second embodiment of the present invention.
Figure 9:
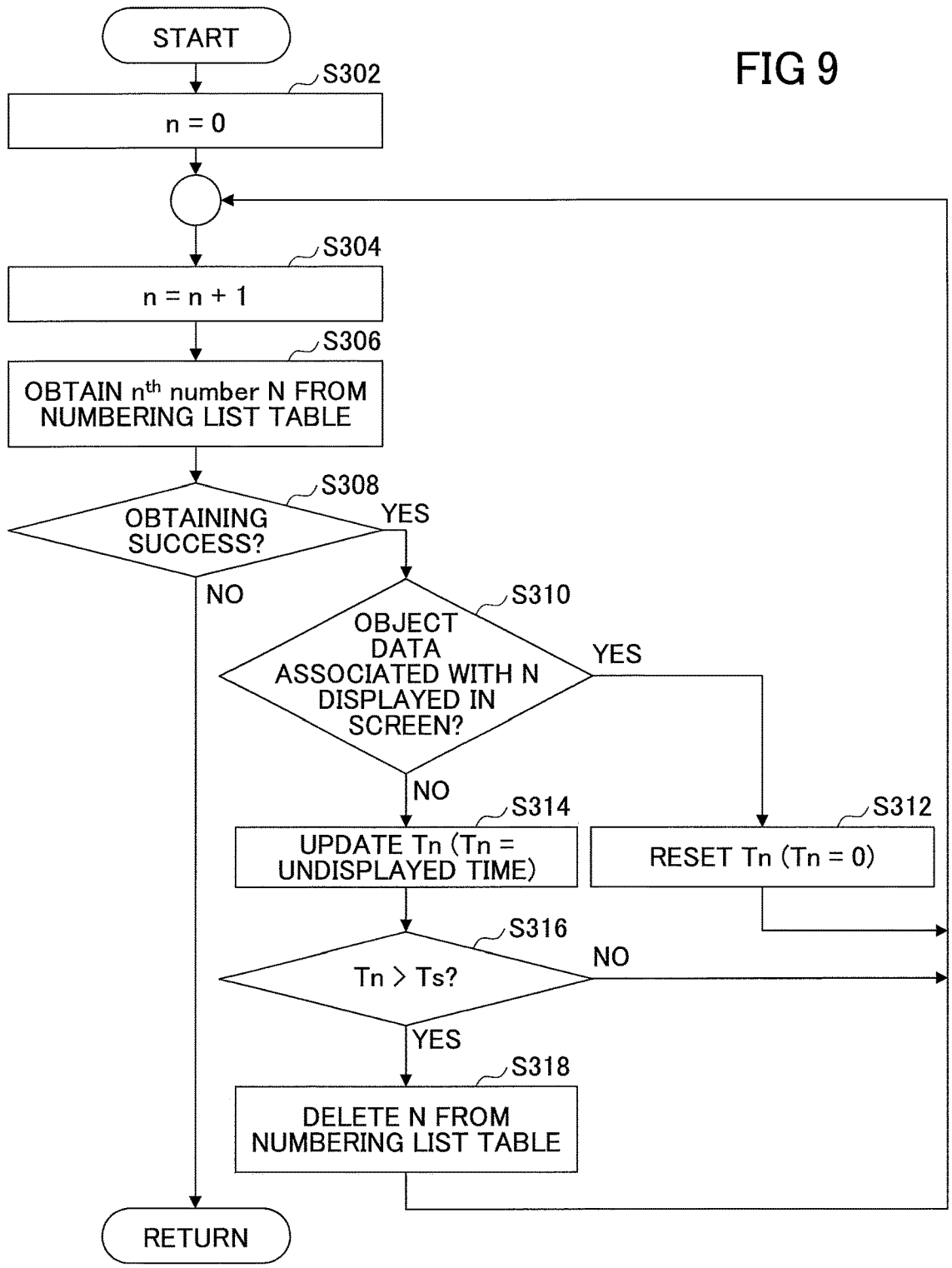
FIG. 9 is a flowchart illustrating an numbered object data process according to the second embodiment of the present invention.

Next, an example of a display control process and examples of data object processes according to the second embodiment are described with reference to FIGS. 8 to 11. In the second embodiment, like components are denoted with like reference numerals as the reference numerals of the first embodiment and are not further explained. FIG. 8 is a flowchart illustrating the display control process of the second embodiment. FIG. 9 is a flowchart illustrating the data object process of the second embodiment when object data is already numbered. FIG. 11 is a flowchart illustrating the data object process of the second embodiment when object data is not yet numbered (unnumbered).

In the example of FIG. 8, the image recognition unit 11 detects an AR marker included in an image captured by the image capture unit 10 when the AR application is activated (Step S10). The AR marker recognition unit 12 extracts object data 21 corresponding to the AR marker 30 from the object data management table 2 (Step S12). The display unit 14 reads the AR marker from an overlay position and displays the object data at the overlay position (Step S14). Then, a numbered-object data process is executed (Step S30). Then, an unnumbered-object data process is executed (Step S40).

Example of Numbered-Object Data Process

FIG. 9 is a flowchart illustrating an example of the numbered-object data process of Step S30 of FIG. 8. The following variables are used in the numbered-object data process.
n: counter variable
N: $n^{th}$ assigned number in numbering list table 40
Tn: time in which object data associated with assigned number N continues to be in non-displayed state
Ts: time for retaining an assigned number in non-displayed state (assigned number retention time) (Ts≥0)

Note that the number retention time is determined beforehand. The values of "Tn" and "Ts" are stored in the storage unit 13.

First, the generation unit 18 sets "0" as the counter variable "n" (Step S302). Then, the generation unit 18 adds "1" to the counter variable n (Step S304). Then, the generation unit 18 obtains the $n^{th}$ assigned number N from the numbering list table 40 (Step S306). Then, the generation unit 18 determines whether the $n^{th}$ assigned number N is successfully obtained from the numbering list table 40 (Step S308). In a case where the generation unit 18 determines that the obtaining of the $n^{th}$ assigned number N is a failure, the process of FIG. 8 is finished. On the other hand, in a case where the generation unit 18 determines that the obtaining of the $n^{th}$ assigned number N is a success, the generation unit 18 determines whether the object data stored in correspondence with the assigned number N is displayed on the screen 44 (Step S310). In a case where the generation unit 18 determines that the object data associated with the assigned number N is in the screen 44, the generation unit 18 resets the time Tn in which the object data associated with the assigned number N continues to be in a non-displayed state (Tn=0). Then, the process of FIG. 8 returns to Step S304.

In a case where the generation unit 18 determines that the object data associated with the assigned number N is not displayed on the screen 44, the generation unit 18 updates the time Tn in which the object data associated with the assigned number N continues to be in a non-displayed state (Step S314).

Then, the generation unit 18 determines whether the "time Tn in which the object data associated with the assigned number N continues to be in a non-displayed state" is longer compared to the "assigned number retention time Ts" (Step S316). In a case where the "time Tn in which the object data associated with the assigned number N continues to be in a non-displayed state" is less than or equal to the "assigned number retention time Ts", the process of FIG. 8 returns to Step S304. On the other hand, in a case where the "time Tn in which the object data associated with the assigned number N continues to be in a non-displayed state" is longer (greater) than the "assigned number retention time Ts", the generation unit 18 deletes the assigned number N from the numbering list table 40 (Step S318). Then, the process of FIG. 8 returns to Step S304.

Figure 10:
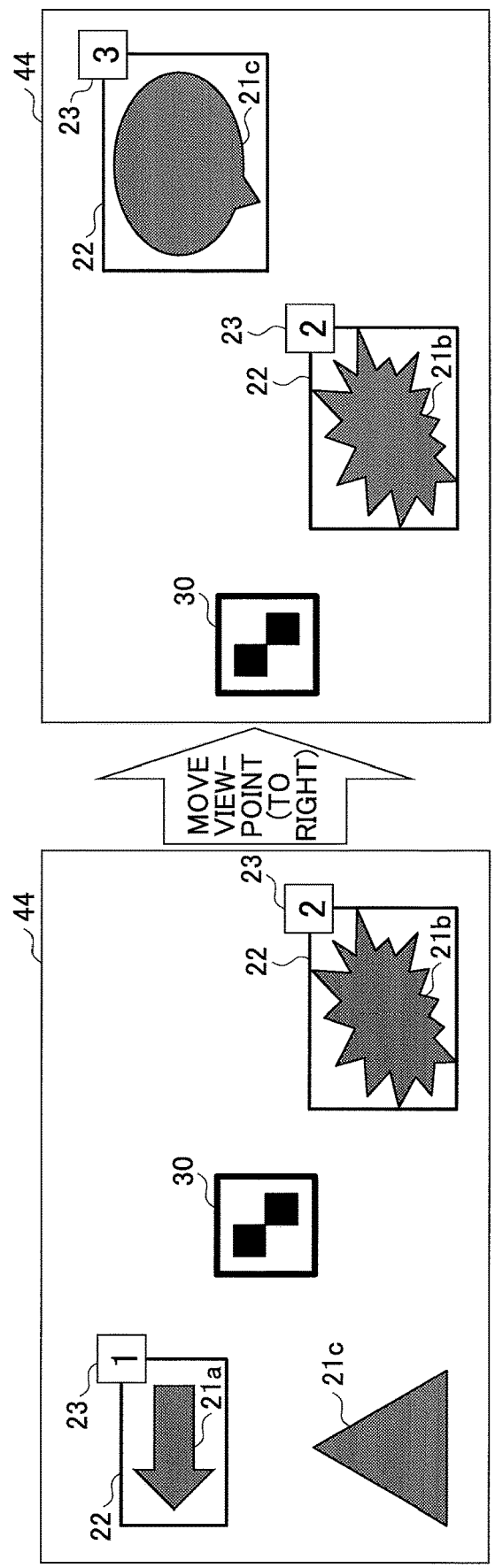
FIG. 10 is a schematic diagram for describing the numbering of object data in correspondence with a viewpoint movement according to the second embodiment of the present invention.
Figure 11:
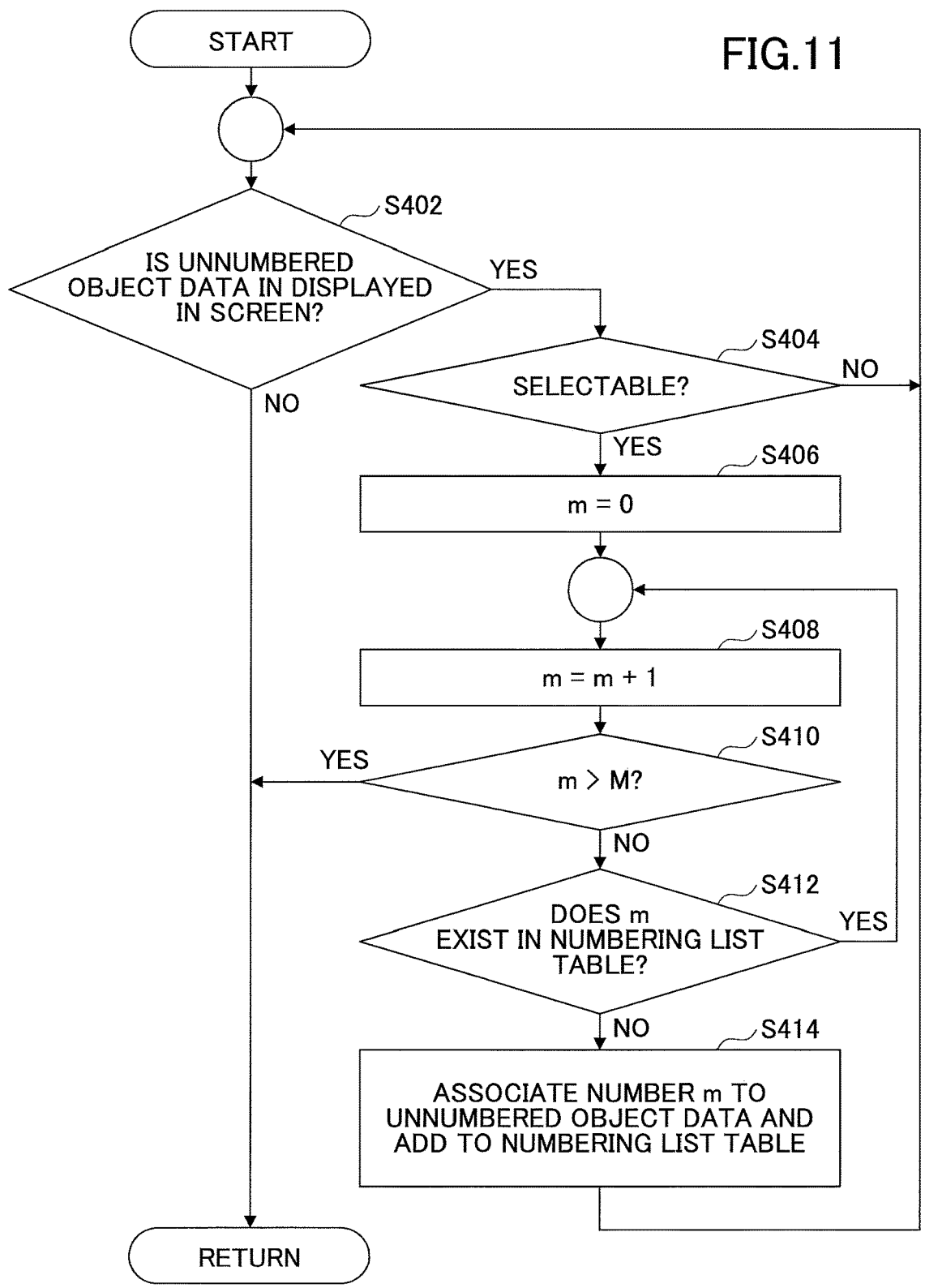
FIG. 11 is a flowchart illustrating an unnumbered object data process according to the second embodiment of the present invention.

Accordingly, even in a case where the user wearing the HMD 1 moves his/her viewpoint to the right to change the view of object data 21 from the state illustrated on the left side of FIG. 10 to the state illustrated on the right side of FIG. 10, the assigned number N corresponding to the object data 21a that has moved out of the screen 44 can remain assigned to the object data 21a for a certain period of time. That is, the assigned number "1" of the object data 21a is retained in a case where the time Tn of the non-displayed state of the object data 21a is less than or equal to the assigned number retention time Ts. Thus, in a case where the user wearing the HMD 1 moves his/her viewpoint to the left to change the view of object data 21 from the state illustrated on the right side of FIG. 10 to the state illustrated on the left side of FIG. 10 within the assigned number retention time Ts, the assigned number 23 "1" is reappears (displayed again in the vicinity of the object data 21a. Thereby, the number assigned to the same object data 21a can be prevented from being changed by, for example, reciprocation of the viewpoint during a short period of time. Once a number is assigned to any one of the object data 21, the same number is not displayed during a certain period of time even if the object data 21 is not displayed on the screen 44. Thereby, the object data 21 can be prevented from being erroneously selected.

In this embodiment, an assigned number N associated with an object data 21 becomes invalid after a certain period of time elapses. Once the assigned number N becomes invalid, the same number as the assigned number N is permitted to be assigned to another object data. For example, in a case where the time Tn in which the object data 21a is in a non-displayed state is longer than the assigned number retention time Ts, the assigned number N "1" of the object data 21a is deleted from the numbering list table 40, and the number "1" can be assigned to another object data 21. Accordingly, object data 21 can be designated by using a few assignment numbers. As a result, desired object data 21 can be accurately selected even for object data whose position on the screen 44 changes.

Example of Unnumbered-Object Data Process

FIG. 11 is a flowchart illustrating an example of the unnumbered-object data process of Step S40 of FIG. 8. The following variables are used in the unnumbered-object data process.

m: counter variable
M: maximum assignable numbers (1≤M)

First, the generation unit 18 determines whether the object data that is not assigned with a number (unnumbered object data) is displayed on the screen 44 (Step S402). In a case where the generation unit 18 determines that there is no unnumbered object data 21 displayed in the screen 44, the process of FIG. 11 is finished. On the other hand, in a case where the generation unit 18 determines that an unnumbered object data is displayed on the screen 44, the generation unit 18 determines whether the unnumbered object data is selectable (Step S404). In a case where the generation unit 18 determines that the unnumbered object data cannot be selected, the process of FIG. 11 returns to Step S402.

On the other hand, in a case where the generation unit 18 determines that the unnumbered object data is selectable, the generation unit 18 sets "0" as the counter variable "m" (Step S406). Then, the generation unit 18 adds "1" to the counter variable m (Step S408). Then, the generation unit 18 determines whether the counter variable m is greater than the maximum assignable number M (1≤M) (Step S410). In a case where the generation unit 18 determines that the counter variable m is greater than the maximum assignable number M, the process of FIG. 11 is finished.

On the other hand, in a case where the generation unit 18 determines that the counter variable m is less than or equal to the maximum assignable number M, the generation unit 18 determines whether the counter variable m is listed in the numbering list table 40 (Step S412). In a case where the generation unit 18 determines that the counter variable m is listed in the numbering list table 40, the process of FIG. 11 returns to Step S408 and repeats the processes of Steps S408 to S412 until the generation unit 18 determines that the counter variable m is not listed in the numbering list table 40.

In a case where the generation unit 18 determines that the counter variable m is not listed in the numbering list table 40 in Step S412, the generation unit 18 associates the unnumbered object data 21 to an assignment number m and stores the associated unnumbered object data 21 and the assignment number m in the numbering list table 40. Then, the process of FIG. 11 returns to Step S402.

With the above-described display control process and the numbering process of the second embodiment, the visibility of a screen displaying object data can be prevented from degrading by assigning a number to each selectable object data 21 and displaying the numbered object data 21. Further, the selecting of object data 21 can be facilitated by inputting (uttering) the number assigned to the object data 21 by way of audio.

Further, with the above-described display control process and the numbering process of the second embodiment, the assigned number N corresponding to the object data 21a that has moved out of the screen 44 can remain assigned to the object data 21a for a certain period of time. Thereby, the number assigned to the same object data 21a can be prevented from being changed by, for example, reciprocation of the viewpoint during a short period of time. Once a number is assigned to any one of the object data 21, the same number is not displayed during a certain period of time even if the object data 21 is not displayed on the screen 44. Thereby, the object data 21 can be prevented from being erroneously selected.

Third Embodiment

Example of Display Control Process

Figure 12:
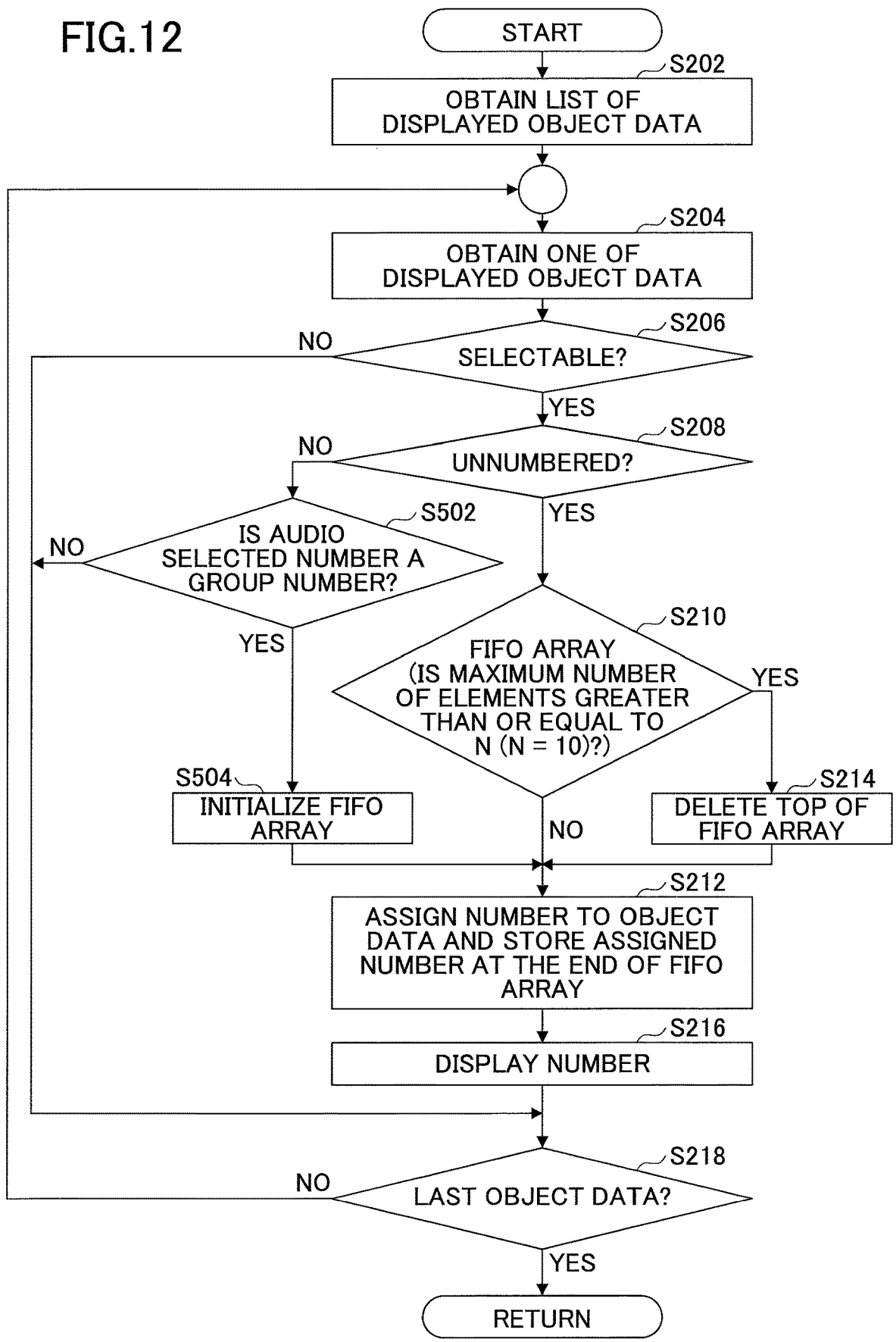
FIG. 12 is a flowchart illustrating a numbering process on a screen according to a third embodiment of the present invention.

Next, an example of a display control process according to the third embodiment is described with reference to FIG. 12. In the third embodiment, like components (steps) are denoted with like reference numerals as the reference numerals of the first and second embodiments and are not further explained. FIG. 12 is a flowchart illustrating another example of a numbering process. The display control process of the third embodiment is different from the display control process of the first embodiment (FIG. 4) in that the numbering process (FIG. 5) that is called for in Step S20 is replaced with the numbering process illustrating in FIG. 12. Therefore, in the third embodiment, only the numbering process of FIG. 12 is described below.

In the third embodiment, a large amount of object data 21 can be numbered even in a case where the numbers that can be assigned in the numbering process are limited. For example, in this embodiment, one or more object data 21 (example of first object data) are grouped according to their position in the screen 44. Accordingly, a number is assigned to each group of object data 21. In a case where the user selects a group from multiple groups of object data 21 byway of audio, numbers are re-assigned (re-numbered) to each object data included in the group selected by the user. For example, when group 2 is selected by way of audio in a case where the screen 44 is in a state illustrated on the upper side of FIG. 13, numbers are re-assigned to three object data 21 included in group 2 (example of second object data) as illustrated with the screen 44 on the lower side of FIG. 13. Accordingly, a large amount of object data 21 can be numbered even in a case where the numbers that can be assigned in the numbering process are limited.

Figure 14:
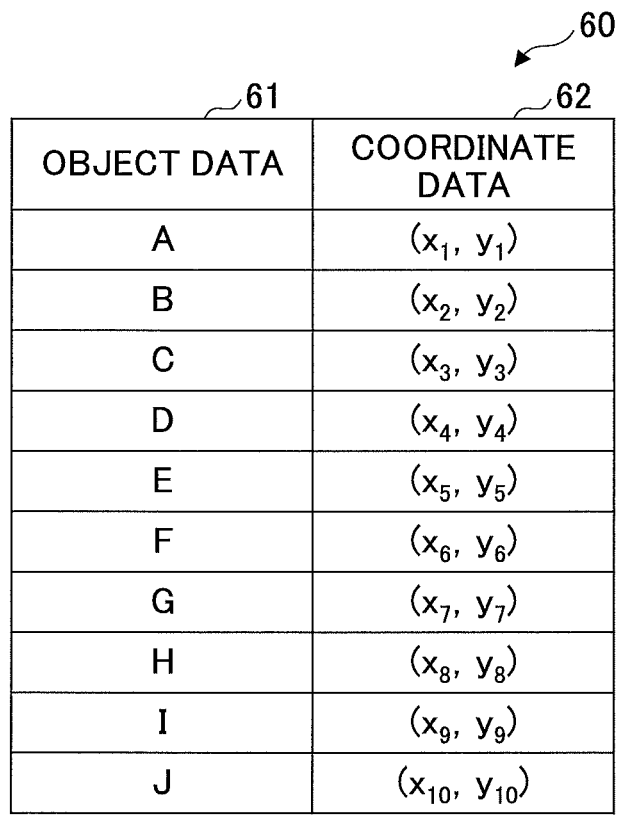
FIG. 14 is a position data table according to the third embodiment of the present invention.

When the numbering process of FIG. 12 is started, the processes of Steps S202 to S210 are executed. Then, the generation unit 18 identifies a display position of object data obtained from the object data 21 illustrated in the upper side of FIG. 13 based on a position data table 60. FIG. 14 illustrates an example of the position data table 60. As illustrated in FIG. 14, object data 61 and coordinate data of a corresponding object data 61 are stored in the position data table 60. In this example, the display position of the object data 21a is identified based on the position data table 60. The generation unit 18 identifies the coordinates $(x_1, y_1)$ of the object data 21a identified by object data "A". In a case where the coordinates $(x_1, y_1)$ of the object data 21a are included in a particular display area, a group number is assigned to the object data 21a identified by the object data "A" (Step S212).

The storage unit 13 associates the assigned number with the object data "A" and stores the associated number and the object data "A" at the end of the FIFO array of the numbering list table 40 (Step S212). FIG. 15 illustrates an example of the numbering list table 40 of this embodiment. An assigned number (group number) 41 "G1" and a corresponding object data 42 "A" are stored in the numbering list table 40. Note that, in a case where the coordinates $(x_1, y_1)$ of the object data 21a is not included in the particular display area, the generation unit 18 assigns a number 41 that is not a group number to the object data 42 "A". In this case, the number 41 that is not a group number "1" is stored in the numbering list table 40 in correspondence with the object data 42 "A". That is, in this embodiment, a group number can be distinguished from a number that is not a group number by adding a letter "G" as a capital letter of the number 41. It is, however, to be noted that the method for assigning a number is not limited to the above-described method. As long as a group number and a number that is not a group number are distinguishably stored in the numbering list table 40 in correspondence with the number 41, other methods for assigning a number may be used.

Returning to FIG. 12, the display unit 14 displays the assigned number in the screen 44 (Step S216). In a case where the number 41 stored in the numbering list table 40 is a group number, the display unit 14 may display a number corresponding to the group number (e.g., a number having the capital letter "G" removed from the number 41 stored in the numbering list table 40). The display unit 14 may display the group number as is on the screen 44 (i.e., display the group number having added the capital letter "G" thereto). In this embodiment, a number having the capital letter "G" removed from the group number is displayed on the screen 44 as illustrated in the upper side of FIG. 13. Then, the process of FIG. 12 proceeds to Step S218 in which the generation unit 18 determines whether the numbered object data 21a is the last object data (Step S218). In a case where the generation unit 18 determines that the numbered object data 21a is not the last object data, the process of FIG. 12 returns to Step S204 and repeats the processes of Steps S204 to S208.

In a case where the object data obtained in Step S208 is numbered, the user selects a number by way of audio. Accordingly, the generation unit determines whether the number selected by the user is a group number (Step S502). In a case where the generation unit 18 determines that the selected number is not a group number, the process of FIG. 12 proceeds to Step S218. On the other hand, in a case where the generation unit 18 determines that the selected number is a group number, the generation unit 18 initializes the FIFO array numbering list table 40 (Step S504). Then, the generation unit 18 assigns a number to each object data included in the selected group and sequentially stores the numbered object data from the end (first row) of the initialized FIFO array (Step S212). The display unit 14 displays the assigned number in the vicinity of a corresponding object data 21.

In a case where "2" is selected by way of audio, the numbers "1", "2", and "3" are re-assigned (re-numbered) to each corresponding object data 21a, 21b, 21c included in the group "2", and the numbers "1", "2", and "3" are displayed together with the corresponding object data 21a, 21b, 21c in the screen 44 as illustrated on the lower side of FIG. 13. FIGS. 15A and 15B illustrate examples of the numbering list table 40 in a case where object data are re-numbered.

With the above-described display control process and the numbering process of the third embodiment, assigned numbers can be switched by designating an assigned number by way of audio. Accordingly, a large amount of object data can be displayed even in a case where the numbers that can be assigned in the numbering process are limited. Thus, the visibility of the screen can be prevented from degrading. Further, the selecting of displayed object data can be facilitated.

Modified Example of Third Embodiment

Next, a modified example of the third embodiment is described with reference to FIG. 16. Similar to the above-described third embodiment, a large amount of object data 21 can be numbered even in a case where the numbers that can be assigned in the numbering process are limited.

In this modified example, the generation unit 18 a predetermined number of object data 21 are numbered based on the position of the object data 21 displayed on the screen 44. The generation unit 18 assigns a shared number, symbol, etc., to any of the object data 21 that have not been numbered. For example, the generation unit 18 performs a numbering process while performing a scanning process (e.g., raster scanning) from an upper left side of the screen 44 in a lower direction and then shifting to the right to repeating the scanning process again as illustrated in the upper side of FIG. 16.

Figure 17A:
FIGS. 17A and 17B are numbering list tables according to the modified example of the third embodiment of the present invention.

For example, in a case where the number that can be assigned in the numbering process is "5", the numbers "1", "2", "3", "4", and "5" are assigned to the object data 21a, 21b, 21c, 21d, and 21e (example of first object data), respectively. The other remaining object data 21f, 21g, 21h, 21i, and 21j are assigned with a group number "0". FIG. 17A illustrates an example of the numbering list table 40 of this modified example.

Figure 17B:

When the user selects the number "0" by way of audio in a case where the numbering list table 40 is in a state illustrated in FIG. 17A, the processes of Steps S502, S504, and S212 of FIG. 12 are executed. Accordingly, the object data 21f, 21g, 21h, 21i, and 21j (example of second object data) are renumbered as illustrated in the numbering list table 40 of FIG. 17B. As a result, the numbers "1", "2", "3", "4", and "5" are assigned to the object data 21f, 21g, 21h, 21i, and 21j, respectively. Further, the number "0" is assigned to the other remaining object data 21a, 21b, 21c, 21d, and 21e.

With the above-described display control process and the numbering process according to the modified example of the third embodiment, assigned numbers can be switched by designating an assigned number by way of audio. Accordingly, a large amount of object data can be displayed even in a case where the numbers that can be assigned in the numbering process are limited. Thus, the visibility of the screen can be prevented from degrading. Further, the selecting of displayed object data can be facilitated.

In each of the above-described embodiments, the selection of object data byway of audio recognition can be implemented by using common words such as numbers (except for the command "mode change"). Therefore, no large capacity dedicated dictionary database is required. Accordingly, the numbering process and the display control process can be performed based on the dictionary table 50 stored in the HMD1 without having to connect to a server.

For example, the dictionary table 50 of FIGS. 7A and 7B includes a pointer 53. Thus, in a case where audio commands 51 such as "then", "next", "right", and "down" are recognized, the operation object 52 is "subsequent pointer". For example, when the user utters "then", "next", "right", or "down (or up)" in a state where the current pointer is pointing at the operation object 52 "object data assigned with 2", the operation object 52 becomes a subsequent pointer "object data assigned with 3". Similarly, when the user utters an audio commence such as "before", "left" or "up (or down)" in a state where the current pointer is pointing at the operation object 52 "object data assigned with 2", the operation object 52 becomes a previous pointer "object data assigned with 1".

The HMD 1 may be connectable to a server via a network. In this case, the communication unit 15 performs data communication (transmission/reception) with an external device such as the server via the network. Further, in this case, the server manages the object data management table 2, the numbering list table 40, the dictionary table 50, and the position data table 60. Further, the server may display object data and the number assigned to the object data on the screen 44 of the HMD 1 by transmitting a number assigned to the object data in response to an AR marker transmitted from the communication unit 15.

The server may be a cloud server constituted from cloud computing. Thus, the above-described examples of the numbering process performed by a client such as the user of the HMD 1 may be performed by the server. In this case, the number of audio commands that can be stored in the dictionary table 50 can be increased.

In defining the names of objects, an object name that is used during audio recognition may be defined in correspondence with each object data. In this case, the client may select object data by using the defined object name.

In defining the fixed numbers to be assigned to the object data, a fixed number may be assigned to each object data beforehand by the server. In this case, the user can always use the same number to select object data because each object data is assigned with a fixed number. However, a number of fixed numbers that is enough to be assigned to the object data is to be prepared.

Alternatively, object data may be numbered dynamically. In this case, a system may be provided in which the server dynamically assigns a number to the object data, and the client obtains the assigned number whenever a number is assigned to object data, so that the client may display the assigned number in correspondence with the object data. In this system, the server manages the numbers that have already been assigned. Further, in a case of sending object data to the client, the server sends the object data together with an available number. The client such as the HMD 1 sends to the server the data pertaining to a number that is no longer displayed when sending a request for object data.

Note that the use of the above-described embodiments may be expanded as described below. For example, in a case where an operation of making a selection and an operation making a decision are separate, a fixed number (e.g., 0) may be assigned for a cancellation operation, so that a cancellation operation can be executed according to the same rules for making a selection. In assigning a number to object data, a rule may be provided for performing a labeling process. For example, a labeling process may be performed according to a rule in which scanning process (e.g., raster scanning) is performed from an upper left side of the screen 44 in a lower direction and then shifting to the right to repeating the scanning process again as illustrated in the upper side of FIG. 16. Thereby, the assigned numbers of object data that are positioned close to each other can be distinguished more easily.

The rules for performing the numbering process may be arranged. For example, a numbering process and a invalidating process may be performed simultaneously when an unnumbered object data is formed by performing FIFO or LRU.

Although the display control method, the data process apparatus, and the display control program are explained according to the above-described embodiments, the display control method, the data process apparatus, and the display control program of the present invention are not limited to the above-described embodiments.

For example, although the above-described embodiments illustrate audio commands 51 being associated with object data of an operation object and being stored beforehand in the dictionary table 50 as illustrated in FIG. 7, an audio command may be dynamically assigned to object data. In this case of dynamically assigning an audio command, the audio commands being already stored in the dictionary table and being used with the user interface (UI) are excluded. Accordingly, object data can be operated (selected) by the dynamically assigned audio command. The object data that is newly assigned with an audio command is stored in the dictionary table 50 in correspondence with the audio command.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method that causes a terminal to execute a display control process, the method comprising:
    specifying object information to be displayed on a display depending on a location of a reference object in an image among a plurality of object information upon detecting the reference object corresponding to the plurality of the object information in the image captured by an imaging device, the location of the reference object varying in the image in accordance with a movement of the imaging device;
    generating a number of identification information corresponding to a current number of the specified object information to be displayed in a display area of the display;
    displaying, on the display, the object information, and the identification information by corresponding to the object information;
    detecting the object information that is selected to be displayed in the display area; and
    determining whether relationship information associated with the detected object information by referring to a storage unit, the storage unit storing the relationship information that associates the object information with the identification information;
    when the relationship information corresponding to the detected object information is stored in the storage unit, the detected object information is displayed in association with the identification information associated with the detected object information,
    when the relationship information corresponding to the detected object information is not stored in the storage unit, a relationship information that associates the detected object information with the identification information is generated and stored in the storage unit,
    when the detected object information disappears from the display area, the relationship information corresponding to the detected object information is erased from the storage unit at a predetermined timing on or after a time when the relationship information corresponding to the detected object information is stored in the storage unit, and
    the predetermined timing is when the number of other object information stored in association with the relationship information exceeds a criterion.

2. The method as claimed in claim 1, further comprising:
    identifying a selectable object information among the object information included in the display area;
    wherein the identified selectable object information is associated with the identification information and displayed in association with the identification information.

3. The method as claimed in claim 1, wherein the generating includes generating the object information according to a position in which the object information is displayed in the display area.

4. A data process apparatus comprising:
    a processor that executes a process including:
    specifying object information to be displayed on a display depending on a location of a reference object in an image among a plurality of object information upon detecting the reference object corresponding to the plurality of the object information in the image captured by an imaging device, the location of the reference object varying in the image in accordance with a movement of the imaging device;
    generating a number of identification information corresponding to a current number of the specified object information to be displayed in a display area of the display,
    displaying, on the display, the object information, and the identification information by corresponding to the object information;
    detecting, by way of the processor, the object information that is selected to be displayed in the display area, and
    determining, by way of the processor, whether relationship information associated with the detected object information by referring to the memory, the memory storing the relationship information that associates the object information with the identification,
    when the relationship information corresponding to the detected object information is stored in the memory, the detected object information is displayed in association with the identification information associated with the detected object information,
    when the relationship information corresponding to the detected object information is not stored in the memory, the relationship information that associates the detected object information with the identification information is generated and stored in the memory,
    when the detected object information disappears from the display area, the relationship information corresponding to the detected object information is erased from the memory at a predetermined timing after the detected object information disappears from the display area, and
    the predetermined timing is when the period in which the detected object information reappears in the display area satisfies a criterion.

5. The data process apparatus as claimed in claim 4, wherein the display control process further includes identifying, by way of the processor, selectable object information among the object information included in the display area, and wherein the identified selectable information is associated with the identification information and displayed in association with the identification information.

6. The data process apparatus as claimed in claim 4, wherein the generating includes generating, by way of the processor, the object information according to a position in which the object information is displayed in the display area.

7. The data process apparatus as claimed in claim 4,
wherein the display control process further includes
assigning an order to the identification information displayed in association with the object information,
wherein the object information includes a first object information displayed on a left side of the display area and a second object information displayed on a right side of the display area, and
wherein the order assigned to the identification information of the first object information precedes the order assigned to the identification information of the second object information.

8. The data process apparatus as claimed in claim 7, wherein the display control process further includes
analyzing, by way of the processor, audio information input to the data process apparatus, and
determining, by way of the processor, whether audio indicating a predetermined command is included in the audio information, and
wherein when the audio indicating the predetermined command is determined to be included in the audio information, an order to select the first object information before selecting the second object information is switched to an order to select the second object information before selecting the first object information.

9. The data process apparatus as claimed in claim 8, wherein the audio includes audio corresponding to right, then, or next.

10. The data process apparatus as claimed in claim 4, wherein the display control process further includes
detecting, by way of the processor, the object information that is selected to be displayed in the display area, and
determining, by way of the processor, whether relationship information associated with the detected object information by referring to a storage unit, the memory storing the relationship information that associates the object information with the identification information,
wherein when the relationship information corresponding to the detected object information is stored in the memory, the detected object information is displayed in association with the identification information associated with the detected object information,
wherein when the relationship information corresponding to the detected object information is not stored in the memory, the relationship information that associates the detected object information with the identification information is generated and stored in the memory,
wherein when the detected object information disappears from the display area, the relationship information corresponding to the detected object information is erased from the memory at a predetermined timing on or after a time when the relationship information corresponding to the detected object information is stored in the memory, and
wherein the predetermined timing is when the number of other object information stored in association with the relationship information exceeds a criterion.

11. A non-transitory recording medium storing a program that causes a terminal to execute a display control process, the display control process comprising:
specifying object information to be displayed on a display depending on a location of a reference object in an image among a plurality of object information upon detecting the reference object corresponding to the plurality of the object information in the image captured by an imaging device, the location of the reference object varying in the image in accordance with a movement of the imaging device;
generating a number of identification information corresponding to a current number of the specified object information to be displayed in a display area of the display;
displaying, on the display, the object information, and the identification information by corresponding to the object information;
detecting the object information that is selected to be displayed in the display area, and
determining whether a relationship information associated with the detected object information by referring to a storage unit, the storage unit storing the relationship information that associates the object information with the identification information,
when the relationship information corresponding to the detected object information is stored in the storage unit, the detected object information is displayed in association with the identification information associated with the detected object information,
when the relationship information corresponding to the detected object information is not stored in the storage unit, a relationship information that associates the detected object information with the identification information is generated and stored in the storage unit,
when the detected object information disappears from the display area, the relationship information corresponding to the detected object information is erased from the storage unit at a predetermined timing on or after a time when the relationship information corresponding to the detected object information is stored in the storage unit, and
the predetermined timing is when the number of other object information stored in association with the relationship information exceeds a criterion.

12. The non-transitory recording medium as claimed in claim 11,
wherein the display control process further comprises identifying a selectable object information among the object information included in the display area, and
wherein the identified selectable information is associated with the identification information and displayed in association with the identification information.

13. The non-transitory recording medium as claimed in claim 11, wherein the generating includes generating the object information according to a position in which the object information is displayed in the display area.

14. The non-transitory recording medium as claimed in claim 11,
wherein the display control further comprises assigning an order to the identification information displayed in association with the object information,
wherein the object information includes a first object information displayed on a left side of the display area and a second object information displayed on a right side of the display area, and
wherein the order assigned to the identification information of the first object information precedes the order assigned to the identification information of the second object information.

15. The non-transitory recording medium as claimed in claim 14, wherein the display control process further comprises analyzing audio information input to the computer, and determining whether audio indicating a predetermined command is included in the audio information;

wherein when the audio indicating the predetermined command is determined to be included in the audio information, an order to select the first object information before selecting the second object information is switched to an order to select the second object information before selecting the first object information.

16. The non-transitory recording medium as claimed in claim 15, wherein the audio includes audio corresponding to right, then, or next.

17. The non-transitory recording medium as claimed in claim 11, wherein the display control process further comprises detecting the object information that is selected to be displayed in the display area, and determining whether relationship information associated with the detected object information by referring to a storage unit, the storage unit storing the relationship information that associates the object information with the identification information, wherein when the relationship information corresponding to the detected object information is stored in the storage unit, the detected object information is displayed in association with the identification information associated with the detected object information, wherein when the relationship information corresponding to the detected object information is not stored in the storage unit, the relationship information that associates the detected object information with the identification information is generated and stored in the storage unit, wherein when the detected object information disappears from the display area, the relationship information corresponding to the detected object information is erased from the storage unit at a predetermined timing after the detected object information disappears from the display area, and wherein the predetermined timing is when the period in which the detected object information reappears in the display area satisfies a criterion.

* * * * *